United States Patent [19]

Lee

[11] Patent Number: 4,619,793
[45] Date of Patent: Oct. 28, 1986

[54] METHOD OF PRODUCING ANNEALED POLYVINYL ALCOHOL CONTACT LENS

[75] Inventor: Ping I. Lee, Valley Cottage, N.Y.

[73] Assignee: Ciba-Geigy Corporation, Ardsley, N.Y.

[21] Appl. No.: 633,687

[22] Filed: Jul. 26, 1984

Related U.S. Application Data

[63] Continuation of Ser. No. 372,893, Apr. 29, 1982, abandoned.

[51] Int. Cl.$^4$ ............................................. B29D 11/00
[52] U.S. Cl. ..................................... 264/2.6; 264/1.1; 264/2.7; 351/160 H; 523/106; 525/61; 525/937
[58] Field of Search .......................... 264/1.1, 2.6, 2.7; 351/160 H; 523/106, 108; 525/61, 937

[56] References Cited

U.S. PATENT DOCUMENTS

| | | | |
|---|---|---|---|
| 3,193,542 | 7/1965 | Imai | 525/62 |
| 3,232,916 | 2/1966 | Fogle | 525/62 |
| 3,408,429 | 10/1968 | Wichterle . | |
| 3,548,031 | 12/1970 | Oyanogi | 525/62 |
| 3,679,646 | 7/1972 | Bristol | 525/62 |
| 4,255,475 | 3/1981 | DelGrande . | |
| 4,343,787 | 8/1982 | Katz . | |

FOREIGN PATENT DOCUMENTS

| | | | |
|---|---|---|---|
| 754452 | 3/1967 | Canada | 264/2.7 |
| 47-6910 | 2/1972 | Japan | 264/2.6 |
| 49-35466 | 9/1974 | Japan | 351/160 H |
| 51-30749 | 3/1976 | Japan | 523/106 |
| 54-43496 | 11/1979 | Japan | 525/61 |

OTHER PUBLICATIONS

Journal of Membrane Science, 9, (1981), 53–67.

*Primary Examiner*—James Lowe
*Attorney, Agent, or Firm*—Michael W. Glynn; Irving M. Fishman

[57] ABSTRACT

Optically clear soft contact lenses of aqueous swollen solid polyvinyl alcohol having a weight average molecular weight of at least 6,000, having been annealed under crystallinity promoting conditions to effectively increase the elastic modulus of the swollen lenses, and optionally subsequently crosslinked, and methods of preparation and the use thereof are disclosed. The lenses are characterized by their relatively high oxygen transmissibility, sufficient to meet the needs of the human cornea, high optical clarity, improved hot water resistance and superior mechanical properties.

32 Claims, No Drawings

METHOD OF PRODUCING ANNEALED POLYVINYL ALCOHOL CONTACT LENS

This application is a continuation of application Ser. No. 372,893, filed Apr. 29, 1982, now abandoned.

BACKGROUND OF THE INVENTION

This invention relates to soft contact lenses made of thermally annealed polyvinyl alcohol.

In general, existing aqueous swollen soft contact lens materials based in polymers of HEMA, also known as hydroxyethyl methacrylate or as ethylene glycol monomethacrylate, suffer from either weak mechanical strength, low dissolved oxygen permeability or a combination of both. Moreover, aqueous swollen soft contact lenses of crosslinked HEMA with one or more optional comonomers are known, as described in U.S. Pat. Nos. 2,976,576, 3,841,985 and 3,985,697. Such hydrogel polymers also suffer from either weak mechanical strength, insufficient dissolved oxygen permeability or a combination thereof. Efforts to increase oxygen permeability by increasing the water content of the hydrogels result in a further decline in the mechanical strength of the lens material to such an extent that they are extremely fragile.

Also, a polyvinyl alcohol crosslinked with glyoxal has been proposed as a contact lens material in U.S. Pat. No. 3,408,429. However, no disclosure of polyvinyl alcohol molecular weight, and no specifics concerning the amount of water present in the crosslinking step are disclosed. Additionally, there is no disclosure of annealing under crystallinity promoting conditions.

Furthermore, polyvinyl alcohol films and gels have been reported as opthalmic inserts in the lower conjunctival sac when imbibed with antibiotics such as tetracycline, pilocarpine, atropine and the like. Such materials are either in the form of a crosslinked film or as a water soluble viscous solution or gel. See, for example, Y. F. Maichuk, Ophthalmic Drug Inserts, *Invest. Ophthalmol.*, Vol. 14, pages 87–90 (1975); D. W. Lamberts, Solid Delivery Devices, *Int. Ophthalmol. Clinic*, Vol. 20, No. 3, pages 68–69 (1980) and Y. F. Maichuk, *Antibiotik*, Vol. 12, No. 4, pages 43 2-5 (1967).

Further, the crosslinking of polyvinyl to form a borate crosslinked polyvinyl alcohol contact lens alcohol with a borate is disclosed in Applicant's copending U.S. application Ser. No. 308,742, filed Oct. 5, 1981, and now abandoned, the disclosure of which is hereby incorporated by reference in toto.

It is an object of the present invention to provide soft contact lenses obviating or substantially reducing the aforementioned drawbacks associated with the prior art.

It is a further object of the present invention to provide soft contact lenses comprising polyvinyl alcohol which has been annealed under crystallinity promoting conditions such that the annealed aqueous swollen lenses are substantially insoluble in the ocular tear environment, possess a high water content, an oxygen transmissibility in excess of that necessary to meet the needs of the human cornea, improved hot water resistance and superior mechanical properties.

It is a further object of the invention to provide, simple, low cost processes for the preparation of such lenses.

It is a further object of the invention to provide a method of correcting vision in patients in need of the same by wearing such a lens on the surface of the cornea.

It is a further object of the invention to provide a method of cosmetic enhancement of the eye of a patient by wearing such a lens, which has been suitably tinted to simulate the iris of desired color, on the surface of the cornea.

DETAILED DESCRIPTION OF THE INVENTION

The present invention provides optically clear soft contact lenses of swollen solid polyvinyl alcohol having a weight average molecular weight of at least about 6,000, which has been annealed under crystallinity promoting conditions, swollen in a suitable solvent and optionally subsequently sparingly crosslinked with a tetravalent metal salt or complex or an organic polyfunctional crosslinking agent, the resultant annealed, and optionally crosslinked, swollen lens possessing an oxygen transmissibility capability in an aqueous environment in excess of that necessary to meet the needs of the human cornea.

Preferably, the polyvinyl alcohol has a weight average molecular weight of at least about 10,000.

As an upper limit, the polyvinyl alcohol may have a weight average molecular weight of up to 1,000,000. Preferably, the polyvinyl alcohol has a weight average molecular weight of up to 300,000.

Polyvinyl alcohol is ordinarily prepared by hydrolysis of the corresponding polyvinyl acetate. In a preferred embodiment, the polyvinyl alcohol contains less than 1 mole % of the polyvinyl acetate units.

Ordinarily, polyvinyl alcohol predominately possesses a poly(2-hydroxy)ethylene structure. However, the polyvinyl alcohol starting material may also contain a minor amount of hydroxyl groups in the form of 1,2-glycols, such as copolymer units of 1,2-dihydroxyethylene in the chain, obtained for example, by alkaline hydrolysis of vinyl acetate-vinylene carbonate copolymers. Advantageously, such a copolymer contains less than 20 mole % of such units, preferably less than 10 mole % of such units.

Moreover, the polyvinyl alcohol may contain minor amounts of copolymer units of ethylene, propylene, acrylamide, methacrylamide, dimethacrylamide, hydroxyethylmethacrylate, methyl methacrylate, methyl acrylate, ethyl acrylate, vinyl pyrrolidone, hydroxyethylacrylate, allyl alcohol, and the like. Preferably, the polymer should contain not more than 5 mole % of units other than those of vinyl alcohol. Most preferably, the polyvinyl alcohol contains less than 1 mole % of such copolymer units.

Commercial polyvinyl alcohol resin may be used, such as ELVANOL 71-30 manufactured by DuPont, or Vinol 125 manufactured by Air Products, Inc.

Preferably, the polyvinyl alcohol to be annealed is substantially insoluble in water up to 50° C., most preferably up to 60° C.

While such preferred polyvinyl alcohol resins are not soluble in water, they are water swellable, preferably to an extent of at least 50% by weight water at equilibrium, at 25° C. The polyvinyl alcohol to be annealed is ordinarily in the form of a shape retaining mass and may be in the form of a sheet, block, rod, disk, contact lens replica or plasticized shape retaining mass. The polyvinyl alcohol to be annealed should advantageously contain less than 20% by weight water, preferably not more than 15% by weight water, since for example under elevated temperature conditions, the polyvinyl alcohol may tend to dissolve in the residual water present. Moreover, when excess water is present the advantageous increase in crystallinity cannot be ordinarily obtained.

The polyvinyl alcohol to be annealed may contain up to 80% by weight of non-aqueous plasticizer. Preferred plasticizers include polyols, such as ethylene glycol, propylene glycol, and glycerol, amines, such as pyridine, trimethylamine and ethanolamine, ethers, such as ethylene glycol mono- and di-methyl ether, or tetrahydrofuran, formamide, dimethylformamide, dimethylsulfoxide, or plasticizer salts such as sodium thiocyanate, ammonium thiocyanate, ethanolamine salts, including triethanolamine acetate and triethanolamine hydrochloride, and the like. The maximum amount of plasticizer present for optimum results will depend upon the nature of the plasticizer and the annealing conditions for a given polyvinyl alcohol material. A substantial excess of plasticizer under elevated temperature conditions, such as may be present in thermal annealing, may result in phase separation of the plasticizer as the polyvinyl alcohol is annealed and is thus to be avoided. Preferably, the amount of plasticizer should not generally exceed 70% by weight of the plasticizer plus polyvinyl alcohol to be thermally annealed.

Annealing of the polyvinyl alcohol increases the degree of crystallinity, in term of weight fraction of the crystalline region in the polyvinyl alcohol. This is accompanied by a decrease in its equilibrium water content when subsequently swollen. As a result of the increase of the weight fraction of the crystalline region, significant improvements in the mechanical properties of the resin and in its hot water resistance are obtained.

The degree of crystallinity, in terms of the weight fraction of crystalline material present in the dry polymer, is calculated according to the density technique set forth in A. Packter and M. S. Nerurkar, *European Polymer Journal*, Vol. 4, pages 685-693 (1968), where the density of 100 percent of crystaline polymer is taken to be 1.340 and the density of 100 percent amorphous polymer is taken to be 1.270 for polyvinyl alcohol as determined by H. Tadokoro, *Bull. Chem. Soc. Japan*, Vol. 27 P. 451 (1954); Vol. 28, p. 599 (1955).

The polyvinyl alcohol resin may be annealed under crystallinity promoting conditions by various techniques. One method is to carefully evaporate an aqueous or aqueous/plasticizer containing polyvinyl alcohol gel in accordance with the technique set forth in the A. Packter and M. S. Nerurkar article, supra, incorporated by reference in toto herein, for extended periods of time.

Another method of annealing is by stress induced crystallization in the solid state such as high pressure compression techniques, for example at about 500 psi for an extended period of time, or correspondingly higher pressures for reduced periods of time.

Preferably, however, the polyvinyl alcohol is in the form of a shape retaining optionally plasticized mass and is thermally annealed, optionally at superatmospheric pressure, by heat treatment until the desired degree of crystallinity is obtained. In thermal annealing the temperature range is advantageously between about 45° C. and about 200° C., preferably between about 50° C. and 150° C., and most preferably between 75° C. and 125° C. The polyvinyl alcohol advantageously contains less than 20% by weight water, preferably not more than 15% by weight water, most preferably less than 10% by weight water.

The annealing time for thermal annealing will, of course, vary depending upon the degree of crystallinity desired and the temperature range utilized, but will preferably range between about 0.1 minute and about 180 minutes, most preferably between about 1 minute and about 120 minutes, under atmospheric pressure, and correspondingly shorter periods of time under superatmospheric pressure conditions.

The thermal annealing can be conducted in an inert gas, such as nitrogen, helium or the like, or in ambient air. Preferably, the atmosphere is air with a relative humidity of less than 50%.

Independent of the annealing technique utilized, the extent of annealing should be sufficent to increase the crystallinity, and thus the elastic modulus of the polyvinyl alcohol, as compared to the untreated polyvinyl alcohol starting material. The optimum amount of annealing required to increase the crystallinity to the extent desired, will, of course, vary to some degree depending on the tacticity and molecular weight distribution of the polyvinyl alcohol. The optimum amount of crystallinity of any given polyvinyl alcohol mass can be easily determined by varying the annealing conditions, such as annealing temperature and time in thermal annealing, and plotting the resulting elastic modulus and dissolved oxygen permeability, respectively, versus the amount of crystallinity in the weight fraction.

Ordinarily, polyvinyl alcohol which has not been annealed by special treatment has a degree of crystallinity below 0.18; wherein the degree of crystallinity is that weight fraction of the crystalline region present in the total weight of polyvinyl alcohol. After annealing, the polyvinyl alcohol advantageously has a degree of crystallinity between about 0.195 and 0.70, preferably between 0.22 and 0.60, and most preferably between 0.30 and 0.50. Advantageously, the corresponding water swollen annealed material in the substantial absence of plasticizer possesses a refractive index of between about 1.360 to 1.520, preferably between about 1.365 and 1.490, most preferably between about 1.390 to 1.465. Excessive annealing, e.g. resulting in a degree of crystallinity above 0.70, is undesirable as the oxygen permeability is substantially adversely affected. Moreover such excessively annealed materials also exhibit substantially reduced swelling characteristics, as well as a loss of flexability in the swollen product.

Subsequent to annealing, the polyvinyl alcohol may be swollen with a swelling solvent to form a substantially shape retaining gel and optionally crosslinked in the partially to fully swollen state (i.e. equilibrium swollen state) with a chemical crosslinking agent in an amount to further increase elastic modulus thereof while maintaining the requisite optical clarity and sufficient dissolved oxygen transmissability of the polyvinyl alcohol swollen lens final product to meet the oxygen demand. Useful crosslinking agents include formaldehyde, aliphatic or aromatic dialdehydes such as glutaraldehyde, terephthalaldehyde, $\alpha,\omega$-dialdehyde polyvinyl alcohol, and the like; aliphatic or aromatic reactive methylolated polyamines and methylolated polyamides, such as dimethylolurea, dimethylolethylene urea, and trimethylolmelamine; glyoxal; oxalic acid; polyacrolein; divinyl compounds such as divinyl sulfone and compounds containing vinyl sulfone precursors as end groups, such as $\beta$-sulfatoethylsulfonyl and $\beta$-hydroxyethylsulfonyl, as well as reactive derivatives thereof;

triazine derivatives such as 2,4,6-trichloro-1,3,5-triazine and compounds containing chlorinated triazine end groups, as well as reactive derivatives thereof; polyhydroxylated phenolic compounds such as dihydroxy diphenyl sulfone, dihydroxybenzenes, such as resorcinal, and pyrogallol; aliphatic and aromatic polyepoxides such as 1,2,3,4-diepoxybutane and 1,2,7,8-diepoxyoctane; aliphatic and aromatic diisocyanates such as ethylene diisocyanate, 1,2-diisocyanatopropane, 1,3-diisocyanatopropane, 2,4- and 2,6-tolylene diisocyanate and hexamethylene diisocyanate; tetravalent borates, including alkali metal and alkaline earth metal borates, ammonium borates and amine borates, such as ammonium borate, calcium borate, sodium metaborate and sodium tetraborate and methylammonium hydrogen tetraborate; aqueous solutions of boric acid where the pH is adjusted to greater than 7; and tetravalent metal salts, including tetravalent metal salts of zirconium, vanadium, titanium and chromium, such as titanium sulfate, zirconium chloride, vanadyl sulfate, chromic nitrate and organic titanates. Thus, any conventional substantially non-opacifying chemical cross-linked agent for polyvinyl alcohol, capable of forming covalent bonds between itself and the polyvinyl alcohol in a suitable swelling solvent may be used.

Suitable swelling solvents, depending upon the crosslinking agent used, include water, glycerol, ethylene glycol, propylene glycol, acetamide, formamide, ethanolacetamide, dimethylacetamide, ethanolformamide, dimethylformamide, dimethyl sulfoxide, ethanolamine, diethylene triamine, triethylene diamine, triethylene tetramine and piperazine. The swelling solvent chosen should be substantially non-reactive with the crosslinking agent chosen so as not to interfere with the crosslinking reaction of the swollen annealed polyvinyl alcohol substantially shape retaining mass.

Preferably, the annealed polyvinyl alcohol is swollen and treated with an aqueous solution of a borate crosslinking agent at a pH of greater than 7.

It is a crucial aspect of the instant invention that any crosslinking operation on the at least partially swollen polyvinyl alcohol be performed subsequent to the annealing operation.

It has been found that the annealing step is easily controllable, to obtain the desired degree of crystallinity while obtaining a product having acceptable oxygen permeability characteristics in meeting the needs of the human cornea and desirable swellability characteristics, if the optional crosslinking operation is performed subsequent to the annealing step.

Where the polyvinyl alcohol is first crosslinked, however, and then the annealing step is performed, the product produced is unsatisfactory. This is believed to be partly due to the crosslinking agent freezing the polymer network into a less flexible lattice, and partly due to the crosslinking agent effectively reducing the uninterrupted chain length of the polyvinyl alcohol strands. It is the relatively long chain lengths of polyvinyl alcohol coupled with its relatively mobile state on a molecular level which is believed to contribute to the relative ease of controlled formation of crystallites during the annealing process. Therefore, necessarily more severe conditions are needed to substantially increase the crystallinity of crosslinked polyvinyl alcohol, if possible at all, as compared to non-crosslinked polyvinyl alcohol. Accordingly, when attempting to increase the crystallinity of crosslinked polyvinyl alcohol, the resulting annealed product possessed multiple adverse characteristics, including substantially impaired water retention, or swellability, substantially reduced oxygen permeability characteristics, to the extent that sufficiently pre-crosslinked subsequent annealed material has an oxygen permeability totally insufficient to meet the needs of the human cornea, and the tendency to be relatively weak in mechanical strength. Moreover, due to the more extreme conditions necessary to achieve increased crystallinity, the annealing step is correspondingly less controllable.

Furthermore, when crosslinking with a chemical crosslinking agent, the polyvinyl alcohol must first be swollen, and after crosslinking has occurred, then dried to achieve annealing. This not only requires an additional swelling step, but also increases the likelihood of deformation, e.g. where the polyvinyl alcohol is in the form of a contact lens replica. Also, during annealing of the dried crosslinked material, the polyvinyl alcohol crosslinked network tends to collapse, resulting in a substantially irreversible decrease in swelling and reduction of oxygen permeability.

When crosslinking the polyvinyl alcohol in the partially to fully swollen state with a chemical crosslinking agent, subsequent to annealing, between about 0.001 and 10 weight percent of crosslinking agent may be used, based on the weight of polyvinyl alcohol present.

The crosslinking of the annealed polyvinyl alcohol swollen mass tends to freeze the resulting polymer network in place, furthering increasing the mechanical properties of the product.

Where the annealed polyvinyl alcohol is crosslinked with a borate salt in aqueous solution, the nature of the cation moiety is not critical. For purposes of convenience, however, it is preferred that the cation be a pharmaceutically acceptable cation. This obviates a washing step wherein the crosslinked material is washed with a pharmaceutically acceptable base, or salt, to remove the undesired cation.

While not limiting to the precise reaction mechanism by which crosslinking of the polyvinyl alcohol by a borate takes place at a pH greater than 7, it is believed that didiol complex formation occurs between adjacent molecules of polyvinyl alcohol. Under acid conditions, i.e., where the pH is below 7, only the non-crosslinked monodiol complex is believed to be formed. Thus, for example, boric acid can be added to polyvinyl alcohol, e.g. in a melt stage or in aqueous solution to polyvinyl alcohol prior to annealing and the non-crosslinked boric acid containing polyvinyl alcohol can be annealed, and subsequently crosslinked by swelling with a suitable swelling solvent, such as water to which there is then added a base to convert the polyvinyl alcohol/boric acid mass to the swollen crosslinked product.

Where the annealed polyvinyl alcohol is to be crosslinked with a borate, any reactive plasticizer, such as a polyol plasticizer including propylene glycol, ethylene glycol or glycerol should advantageously be removed, e.g. by washing the annealed polyvinyl alcohol mass with water, prior to crosslinking.

The amount of borate present in the crosslinked polyvinyl alcohol, in terms of milligrams of complexed boron per gram of polyvinyl alcohol, is advantageously between about 0.5 and 50, preferably between about 2 and 35, most preferably between about 5 and 25.

The amount of boron present in the crosslinked polyvinyl alcohol should be sufficient to increase the elastic modulus of the crosslinked material compared to the uncrosslinked annealed polyvinyl alcohol starting material. The optimum amount of boron present to substantially increase the elasticity modulus will, of course, vary to some extent depending, inter alia upon the molecular weight distribution and the swellability of the polyvinyl alcohol in water. The optimum amount of boron in any given polyvinyl alcohol substrate can be easily determined by varying the amount of boron present in annealed polyvinyl alcohol samples and plotting the ratio of boron in milligrams to grams of polyvinyl alcohol versus the elastic modulus in pounds per square inch or kilograms per square centimeter.

A substantial excess of crosslinked boron or other crosslinking agent in the polyvinyl alcohol substrate is ordinarily undesirable, to the extent it may adversely affect the elasticity modulus to the annealed polyvinyl alcohol.

The optionally crosslinked annealed contact lenses according to the instant invention possess higher oxygen permeability in comparison, for example, with poly-hydroxyethylmethacrylate.

Similarly, the tensile strength of the optionally crosslinked annealed contact lenses according to the instant invention is far superior to that of poly-hydroxyethyl-methacrylate.

It is important to note that the dissolved oxygen permeability, DK, is an intrinsic property of the contact lens material only, whereas the dissolved oxygen transmissibility, DK/L, describes the actual flux of oxygen per unit oxygen tension (partial pressure) difference across a given lens of thickness L. Thus, the latter is important in determining the capability of a specific lens to meet the cornea oxygen demand. Generally, with the same lens material, the smaller the lens thickness the higher would be its dissolved oxygen transmissibility, DK/L.

As a consequence of the combination of the highly desirable tensile strength, elastic modulus, and high oxygen permeability properties of the instant materials, the resulting contact lenses may be advantageously fabricated either as ultra thin contact lenses having an extremely high oxygen transmissibility in excess of the cornea oxygen demand for continuous wearing while still possessing remarkably superior mechanical strength, e.g. having a thickness between about 0.010 mm and about 0.1 mm, or alternatively, as relatively thick lenses while still possessing adequate oxygen transmissibility, e.g. having a thickness between about 0.2 mm and about 0.5 mm.

In addition, the excellent optical clarity of the optionally crosslinked, annealed polyvinyl alcohol materials make them particularly suitable for use as soft contact lenses to provide good optical acuity and necessary visual correction for the patients.

Thus, the instant contact lenses can advantageously possess a lens thickness of between about 0.010 mm and about 0.5 mm. Ordinarily, for purposes of convenience, the instant contact lens preferably possess a thickness between about 0.03 and 0.25 mm. The instant contact lens diameter can range between about 6 to 20 mm, preferably between about 8 to 16 mm.

The instant optionally crosslinked annealed polyvinyl alcohol materials also exhibit superior elongation characteristics and elastic modulus as compared with poly-hydroxyethylmethacrylate.

The optionally crosslinked annealed polyvinyl alcohol materials possess increased resistance to visco-elastic deformation as compared to the non-annealed polyvinyl alcohol and are, consequently, substantially free of the so called "cold flow" or creep phenomens commonly exhibited in amorphous thermoplastic lens materials. As a result, they are resistant to permanent and significant deformation occasioned during eyelid motion or lens cleaning.

The optionally crosslinked annealed polyvinyl alcohol contact lenses contain, in their swollen use condition, between about 30 to 90 percent by weight water based upon the weight of swollen material, preferably between about 45 to 85 percent by weight water.

The instant contact lenses can be advantageously prepared by various methods.

In one method, method A, the annealed optionally crosslinked, substantially shape-retaining contact lens is prepared by the steps comprising:

(a) forming a lens blank from a substantially non-crosslinked polyvinyl alcohol resin having a weight average molecular weight of at least 6,000, in the presence or absence of a polyvinyl alcohol plasticizer;

(b) annealing said lens blank under crystallinity promoting conditions to effectively increase the elastic modulus of the subsequently swollen contact lens, such that the resulting annealed polyvinyl alcohol blank has a degree of crystallinity between about 0.195 and 0.70 based on the weight fraction of crystalline material present in the polyvinyl alcohol polymer;

(c) removing selected portions of said annealed blank until the remainder of the annealed blank constitutes a replica of said contact lens on a reduced scale; and (d) swelling said annealed replica in an aqueous or nonaqueous swelling solvent, in the presence or absence of a chemical crosslinking agent, to obtain said substantially shape-retaining swollen contact lens, wherein said lens in its swollen equilibrium state with ocular tear fluid, possesses sufficient oxygen transmissibility to meet the needs of the human cornea.

In an alternate method, method B, the annealed optionally crosslinked substantially shape retaining contact lens is prepared by the steps comprising:

(a) forming a replica of a contact lens on a reduced scale in the form of a substantially non-crosslinked polyvinyl alcohol shape retaining polymer resin having a weight average molecular weight of at least 6,000 in the presence or absence of a polyvinyl alcohol plasticizer;

(b) annealing said contact lens replica under crystallinity promoting conditions to effectively increase the elastic modulus of the subsequently swollen contact lens, such that the annealed contact lens replica has a degree of crystallinity between about 0.195 and 0.70 based on the weight fraction of crystalline material present in the polyvinyl alcohol polymer; and (c) swelling said annealed replica in an aqueous or nonaqueous swelling solvent, in the presence or absence of a chemical crosslinking agent, to obtain said substantially shape-retaining swollen contact lens, wherein said lens in its swollen equilibrium state with ocular tear fluid, possesses sufficient oxygen transmissibility to meet the needs of the human cornea.

Preferably, the amount of plasticizer when present, is present in an amount between about 0.01 and 30 percent by weight, based upon the total weight of plasticizer and polyvinyl alcohol; more preferably, between 0.01 and 15 percent by weight in methods A and B.

Preferred plasticizers include polyols, such as ethylene glycol, propylene glycol, glycerol and ethylene glycol, mono- and di-methyl ether, tetrahydrofuran, formamide, dimethylacetamide, dimethylformamide and dimethylsulfoxide.

Most preferably, the plasticizer is glycerol or propylene glycol.

In either method A or method B, boric acid may be incorporated into the polyvinyl alcohol of step (a) thereof. Thus, for example, the lens blank of step (a) in method A may be prepared by casting an aqueous solution of the polyvinyl alcohol and boric acid into a film of a thickness greater than said lens replica, or by adding boric acid to molten polyvinyl alcohol and solidifying the resulting liquid mixture in the form of a lens blank. The lens replica of step (a) in method B.may similarly contain boric acid dissolved or dispersed therein. As the boric acid is not in the requisite tetravalent state, crosslinking will not take place until the subsequent swelling step, where crosslinking is effected by treatment with an aqueous solution having a pH greater than 7.

Also where a polyol plasticizer is incorporated in the starting material of step a of method A or B, and the crosslinking agent is a tetravalent metal salt or the like capable of reacting with the plasticizer, the plasticizer is removed, e.g. by washing with an aqueous solvent, prior to the crosslinking reaction.

In method A, the lens blank starting material of step (a) can be formed by various techniques known per se. Thus, the lens blank can be cut from suitable rods, punched or stamped out from polyvinyl alcohol sheets, or cast from molds, such as by melt extrusionn, and the like.

In method B, the contact lens replica starting material in step (a) therein may likewise be formed by various techniques known per se. For example, suitable lens replicas may be formed by lathing or cutting a solid uncrosslinked polyvinyl alcohol lens blank or the like; or by molding in a suitable mold in the molten state in the presence of a plasticizer; by spin drying an aqueous or aqueous/plasticizer solution of polyvinyl alcohol in a mold, analogous to known spin casting techniques; or by compression molding of an optionally plasticized polyvinyl alcohol film.

As the artisan can appreciate, under crystallinity promoting conditons, step (b) of method B can take place either simultaneously and/or subsequently to the formation of the lens replica formation of step (a). For example, in spin drying, the lens replica polyvinyl alcohol polymer can be annealed in the spin mold under elevated temperature conditions and/or by controlled drying as set forth, inter alia, in the aforementioned A. Packter and M. S. Nerurkar article, and/or by pressurizing the system. Also, under compression molding of the lens replica in a suitable mold, the combination of pressure and elevated temperature for a time sufficient to substantially increase the crystallinity of the replica, may be used to obtain the desired annealed lens replica simultaneously with its formation. Alternatively, the steps of forming the lens replica and annealing the same under crystallinity promoting conditions may be done sequentially, by first forming the lens replica and then annealing the same.

The lens of the instant invention may be tinted if desired with suitable dyes and pigments, for cosmetic effects or for screening out ultraviolet light, or for identification purposes, by methods known, per se in the art. In one embodiment, the crosslinking agent itself may be a chromophore or form a chromophore under the crosslinking conditions. For example, vanadyl sulfate crosslinked polyvinyl alcohol yields a lightly blue tinted optically clear contact lens in the swollen state. Also an organic dye having two reactive groups capable of forming a covalently crosslinked polyvinyl alcohol may be used to form the tinted lens. Alternatively, the coloring material is a pigment, disperse dye or fiber-reactive dye as disclosed in assignee's copeding application U.S. Ser. No. 292,325, filed Aug. 12, 1981.

It is understood that spherical, toric and polyfocal lenses, for use in the human eye, including bifocal contact lenses, having powers covering the ranges from about −20 to about +20 diopters can be advantageously prepared by methods A, and B, described supra. Thus, for example, the overall convex surface of the replicas in methods A and B may contain planar or concave regions where an overall negative diopter, or multiple diopters are desired.

It is further understood that the instant optionally crosslinked polyvinyl alcohol lenses are swollen with aqueous tear fluid under use conditions and this is taken into account in determining the configuration of the annealed lens replica. As a result, the configuration of the annealed lens replica is calculated based upon the extent of swelling which occurs subsequent to the lens replica step, e.g. upon subsequent aqueous treatment such as in the aqueous medium or the aqueous or organic medium in which the optional crosslinking occurs. As the swollen lens is substantially uniform in optionally crosslinked polyvinyl alcohol density, said calculation is straightforward and is dependent upon the percent of water present in the contact lens in their swollen use condition as compared to the amount of water present in the lens prior to swelling.

The contact lens of the instant invention may advantageously be stored for shipping in an isotonic solution having a pH of about 7, or if desired, in an aqueous borate solution.

The following examples are intended as only illustrative and are not intended to limit the nature or scope of the invention. All parts are by weight unless otherwise indicated.

Examples 1-21 illustrate methods of preparation of the soft contact lens system of the present invention.

EXAMPLE 1

A polyvinyl alcohol film of 0.038 cm dry thickness containing 3.4% glycerin as plasticizer was knife cast from an 18% aqueous solution of ELVANOL 71-30 (99-100 mole% hydrolyzed polyvinyl alcohol with the weight-average and number-average molecular weights of 116,000 and 40,000 respectively, manufactured by DuPont) initially containing 0.6% glycerin and subsequently air dried for two days at 23° C. and 40% relative humidity. The dried film contained residual water less than 5%.

The transparent and thermoplastic polyvinyl alcohol film so formed was compressed at about 60-100 psi on a laboratory press for a period of about 10 seconds at 180° C. between the two mold parts of a lens replica shaped mold to form and anneal the same. The concave part of the mold had a radius of curvature of 0.6 an cm and the matching convex part had a radius of curvature of 0.635 cm. The entire mold was preheated to 180° C. before compression molding. An annealed lens replica shaped article was thus formed and separated from the said film. The formed lens was then removed from the mold and cooled to room temperature.

Subsequently the formed lens was washed in distilled water overnight to remove the residual glycerine and swell the lens to its final use condition. The swollen lens was subsequently stored in isotonic saline solution. The lens so formed was soft, resilient, optically clear and substantially resistant to tear and viscoelastic deformation with an equilibrium water content of 47.33% by weight.

EXAMPLE 2

Two compression molded polyvinyl alcohol lenses containing 50% and 70% glycerine as plasticizer were prepared as described in Example 1 except that a molding temperature of 158° C. was used in both cases.

Afterwards, the molded annealed lens replicas were washed and swollen in distilled water overnight removing the residual glycerin, and subsequently stored in istonic saline solution. The lenses so formed were soft, resilient, optically clear and substantially resistant to tear and viscoelastic deformation. The compositions of the lenses were tested for their dissolved oxygen permeabilities at 34° C., the eye temperature, with the use of a polarographic sensor in an air saturated aqueous enviroment. These test results including the equilibrium water content values are presented in Table 1.

TABLE 1

| Example No. | Glycerin Content (%) | Equilibrium Water Content (%) | Dissolved Oxygen permeability at 34° C. $\times 10^{-10} \frac{cm^3 (STP)\ cm}{cm^2 sec\ cmHg}$ |
|---|---|---|---|
| 2A | 50 | 47.7 | 14.47 |
| 2B | 70 | 53.6 | 22.98 |

EXAMPLE 3

A 10% aqueous polyvinyl alcohol solution containing 0.34% glycerin was prepared by dissolving appropriate amounts of elvanol 71-30 and glycerin in water at 100° C. The resulting solution had a Brookfield viscosity about 1,500 cps at room temperature (23° C.).

About 40 mg of the said solution was charged into a glass mold having a spherical concave solid supporting surface with a radius of curvature of 0.5 cm. The mold, having a segment height of 0.4 cm was then attached to a chuck and allowed to rotate about the axis transverse to the supporting surface at 350 revolutions per minute by the use of a variable speed motor. Such a spinning process not only shaped the lens by centrifugal force but also generated a convection of ambient air to facilitate the drying of the said lens. After four hours of drying at 350 rpm, 23° C. and 40% relative humidity, the lens shaped replica was dried to touch.

Afterwards, the dry lens together with the mold was annealed in an oven at 100° C. for one hour. Subsequently, the annealed lens replica was removed from the mold and washed in distilled water overnight to remove the residual glycerin and swell the lens to its final use condition. The swollen lens was then stored in isotonic saline solution. The lens so formed was soft, resilient, optically clear and substantially resistant to tear and viscoelastic diformation with an equilibrium water content of 67.26% by weight.

EXAMPLES 4-9

Several thermally annealed polyvinyl alcohol lenses were prepared as described in Example 3. The swollen lenses, being washed free of glycerin, were then allowed to equilibrate in sodium borate solutions of concentrations up to 4% to achieve a range of desired internal borate crosslinking concentrations. The composition of each lens was tested for its dissolved oxygen permeability at 34° C., the eye temperature, with the use of a polorographic sensor in an air saturated aqueous environment. The wet mechanical properties of the lens composition including tensile strength, elongation at break, and elastic modulus were determined on an Instron tester model 1123. These test results are summarized in Table 2

TABLE 2

| Example No. | Internal Boron concentration in dry PVA[2] (mg/g) | Water[3] Content (%) | Dissolved Oxygen Permeability at 34° C. $\times 10^{-10} \frac{cm^3 (STP)\ cm}{cm^2 sec.\ cmHg}$ | Tensile Strength (psi) | Elongation at break (%) | Elastic Modulus (psi) |
|---|---|---|---|---|---|---|
| 4 | 0 | 67.26 | 32.5 | 1583.5 | 484.5 | 180.3 |
| 5 | 6.13 | 70.80 | 33.5 | 1719.0 | 506.5 | 208 |
| 6 | 10.90 | 75.35 | 38.2 | 1595.9 | 524 | 184.6 |
| 7 | 19.81 | 75.63 | 30.6 | 1269.0 | 442.5 | 152.9 |
| 8 | 36.39 | 82.29 | — | 452.4 | 213.3 | 125.4 |
| 9 | poly-HEMA[1] (control) | 35.88 | 10.28 | 16.5 | 40 | 53.4 |

[1]Poly (2-hydroxyethyl methacrylate) crosslinked with ethylene glycol dimethacrylate
[2]polyvinyl alcohol
[3]at equilibrium The results of the tests shown in Table 2 illustrate the additional increase in tensile strength and elongation at break, as well as elastic modulus, coupled with high dissolved oxygen permeability afforded by crosslinking of the instant thermally annealed polyvinyl alcohol contact lens materials especially in comparison with a conventional poly-HEMA contact lens material.

EXAMPLES 10-16

A series of thermally annealed polyvinyl alcohol lenses were prepared as described in Example 3 except that no glycerin was added to the casting solution and annealing temperatures up to 125° C. were used to achieve a range of crystallinity and water swelling. The crystallinity (weight fraction of crystalline region) of each lens composition was evaluated from its dry density. The density was measured by weighing the samples in air and in heptane at 23° C. The composition of each lens was also tested for its dissolved oxygen permeability and wet mechanical properties according to the procedures and conditions set forth in Examples 4-9. The test results are summarized in Table 3.

TABLE 3

| Example No. | Annealing Condition | Crystallinity (%) | Equilibrium Water Content (%) | Dissolved Oxygen Permeability at 34° C. $\left[ \times 10^{-10} \frac{cm^3 (STP) \, cm}{cm^2 sec \, cmHg} \right]$ | Tensile Strength (psi) | Elongation at Break (%) | Elastic Modulus (psi) |
|---|---|---|---|---|---|---|---|
| 10 | Drying at 23° C. | 16.44 | 82.72 | 44.71 | 117.9 | 240 | 33.8 |
| 11 | 50° C., 1 hr | 19.40 | 80.43 | 54.59 | 103.2 | 215.8 | 41 |
| 12 | 75° C., 1 hr | 38.40 | 80.16 | 35.20 | 843.2 | 364 | 73.8 |
| 13 | 100° C., 0.5 hr | 35.51 | 71.81 | 34.38 | 1020.5 | 433.5 | 112.5 |
| 14 | 100° C., 1 hr | 38.40 | 69.50 | 31.84 | 1278.0 | 417 | 172 |
| 15 | 100° C., 2 hr | 36.96 | 71.51 | 31.75 | 1155.1 | 435 | 158.6 |
| 16 | 125° C., 0.5 hr | 41.29 | 67.53 | 32.46 | 1451.3 | 416.7 | 198.7 |
| 9 | poly-HEMA[1] (control) | — | 35.88 | 10.28 | 16.5 | 40 | 53.4 |

[1] poly (2-hydroxyethyl methacrylate) crosslinked with ethylene glycol dimethacrylate The results of the tests shown in Table 3 illustrate the advantageous increase in tensile strength, elongation at break, and elastic modulus, coupled with high dissolved oxygen permeability afforded by the instant thermally annealed polyvinyl alcohol contact lens materials especially in comparison with a conventional poly-HEMA contact lens material.

EXAMPLE 17

A thermally annealed polyvinyl alcohol lens was prepared as described in Example 3 except that no glycerin was added to the casting solution and the annealing was done at 75° C. for 1 hour. The swollen lens was then allowed to equilibrate in a 0.5% vanadyl sulfate solution with a 5 to 1, solution to polymer ratio to achieve the desired crosslinking through complex formation. The lens so formed was soft, resilient, optically clear with blue tint, and substantially resistant to tear and viscoelastic deformation. Such a lens composition exhibits a dissolved oxygen permeability of $55.52 \times 10^{-10} [cm^3(STP)cm/cm^2 sec \, cmHg]$ at 34° C., a tensile strength of 439.6 psi, an elongation at break of 296.5%, and an elastic modulus of 99 psi.

EXAMPLES 18-21

Four compression molded polyvinyl alcohol plano lenses containing 12.5% glycerin as plasticizer with a diameter of 13 mm and thickness of 0.115 mm were prepared according to the method described in Example 1. After washing and swelling in distilled water to remove the residual glycerin these lenses were then tinted on both sides by reacting each swollen lens in an aqueous mixture of 1 ml of a suitable reactive dye stock solution and 5 ml of a 10% solution of sodium phosphate, tribasic dodecahydrate at room temperature (25° C.) for 1 hour. Afterwards, the tinted lenses were washed in distilled water to remove the residual reactants and subsequently stored in pH 7.4 buffered isotonic saline. The reactive dyes used here were obtained under the trade name REMAZOL (Am. Hoechst Co.). They have the following general formula:

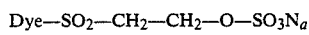

Dye—SO$_2$—CH$_2$—CH$_2$—O—SO$_3$N$_a$

The tinting solution generally occurs at the β-sulfatoethylsulfonyl group which is a vinyl sulfone precursor.

The tinted lenses so obtained show permanent color fast with no extractables. The dye stocks used and the resulting light absorbance of the tinted lenses are summarized in Table 4

TABLE 4

| Example No. | Tinted Color | Dry Stock Solution (aqueous) | Absorbance (Wavelength) |
|---|---|---|---|
| 18 | Green | 0.54% Remazol Black B + 0.54% Remazol Yellow GI | 1.1 (600 nm), 0.88 (420 nm) |
| 19 | Amber | 2% Remazol Golden Orange 36G | 0.37 (485 nm) |
| 20 | Aquamarine | 2.5% Remazol Turquoise P | 0.67 (675 nm) |
| 21 | Blue | 0.25% Remazol Black B | 0.54 (610 nm) |

What is claimed is:

1. In a method of providing corrected vision in patients in need of the same comprising wearing a soft contact lens on the surface of the cornea, the improvement wherein the soft contact lens is an optically clear soft contact lens of swollens solid polyvinyl alcohol having a weight average molecular weight of at least about 6,000, which has been annealed, without prior crosslinking, under crystallinity promoting conditions, to substantially increase the crystallinity thereof, and swollen in a swelling solvent, the resultant annealed, swollen lens possessing an oxygen transmissibility capability in an aqueous environment in excess of that necessary to meet the needs of the human cornea.

2. The method according to claim 1, wherein the at least partially swollen annealed lens is sparingly crosslinked, only after being annealed with a tetravalent metal salt or an organic polyfunctional crosslinking agent.

3. The method according to claim 1, wherein the polyvinyl alcohol has a weight average molecular weight of at least about 10,000.

4. The method according to claim 3, wherein the polyvinyl alcohol has a weight average molecular weight of up to 1,000,000.

5. The method according to claim 3, wherein the polyvinyl alcohol has a weight average molecular weight of up to 300,000.

6. The method according to claim 1, wherein the polyvinyl alcohol contains less than 1 mole % of polyvinyl acetate units.

7. The method according to claim 1, wherein the polyvinyl alcohol, in its pre-annealed form, is substantially insoluble in water up to 50° C.

8. The method according to claim 7, wherein said polyvinyl alcohol, in its pre-annealed form, is substantially insoluble in water up to 60° C.

9. The method according to claim 1, wherein the annealed polyvinyl alcohol has a degree of crystallinity between about 0.195 to 0.70.

10. The method according to claim 9, wherein the degree of crystallinity is between about 0.22 and 0.60.

11. The method according to claim 10, wherein the degree of crystallinity is between 0.30 and 0.50.

12. The method according to claim 2, wherein said crosslinking agent is a tetravalent metal salt.

13. The method according to claim 12, wherein said crosslinking agent is a borate.

14. The method according to claim 13, wherein the milligrams of complexed boron per gram of polyvinyl alcohol is between about 0.5 to 50.

15. The method according to claim 1, wherein said lens possesses a maximum lens thickness between about 0.010 mm and about 0.5 mm and a lens diameter between about 6 mm and 20 mm.

16. The method according to claim 1, wherein said lens contains in its swollen use condition between about 30 and 90 percent water based on the weight of swollen lens.

17. The method according to claim 16, wherein said lens contains about 45 to 85 percent water.

18. The method according to claim 1 wherein said lens has been tinted with a dye or pigment.

19. A process for preparing an optically clear soft contact lens of swollen solid polyvinyl alcohol having a weight average molecular weight of at least about 6,000, which has been annealed, without prior crosslinking, under crystallinity promoting conditions, to substantially increase the crystallinity thereof, and swollen in a swelling solvent, the resultant annealed, swollen lens possessing an oxygen transmissibility capability in an aqueous environment in excess of that necessary to meet the needs of the human cornea comprising:
   (a) forming a lens blank from a substantially non-crosslinked polyvinyl alcohol resin having a weight average molecular weight of at least 6,000;
   (b) annealing said lens blank under crystallinity promoting conditions to effectively increase the elastic modulus of the subsequently swollen contact lens, such that the resulting annealed polyvinyl alcohol blank has a degree of crystallinity between about 0.195 and 0.70 based on the weight fraction of crystalline material present in the polyvinyl alcohol polymer;
   (c) removing selected portions of said annealed blank until the remainder of the annealed blank constitutes a replica of said contact lens on a reduced scale; and
   (d) swelling said annealed replica in an aqueous or nonaqueous swelling solvent, to obtain said substantially shape-retaining swollen contact lens, wherein said lens in its swollen equilibrium state with ocular tear fluid, possesses sufficient oxygen transmissibility to meet the needs of the human cornea.

20. The process of claim 19 wherein said step (a) is carried out in the presence of a polyvinyl alcohol plasticizer.

21. A process according to claim 20, wherein step (a) is conducted in the presence of about 0.01 to 70% by weight plasticizer, based on the total weight of plasticizer and polyvinyl alcohol.

22. A process according to claim 21, wherein there is between about 0.01 and 30 percent by weight, based on the total weight of plasticizer and polyvinyl alcohol.

23. A process according to claim 20, wherein the plasticizer is glycerol or propylene glycol.

24. The process of claim 19 wherein said step (d) is carried out in the presence of a chemical crosslinking agent.

25. A process according to claim 19, wherein the annealing step (b) is conducted under thermal annealing conditions between about 45° C. and 200° C., in the presence of less than 20% by weight water.

26. A process for preparing an optically clear soft contact lens of swollen solid polyvinyl alcohol having a weight average molecular weight of at least about 6,000, which has been annealed, without prior crosslinking, under crystallinity promoting conditions, to substantially increase the crystallinity thereof, and swollen in a swelling solvent, the resultant annealed, swollen lens posessing an oxygen transmissibility capability in an aqueous environment in excess of that necessary to meet the needs of the human cornea comprising:
   (a) forming a lens blank from a substantially non-crosslinked polyvinyl alcohol resin having a weight average molecular weight of at least 6,000;
   (b) annealing said lens blank under crystallinity promoting conditions to effectively increase the elastic modulus of the subsequently swollen contact lens, such that the resulting annealed polyvinyl alcohol blank has a degree of crystallinity between about 0.195 and 0.70 based on the weight fraction of crystalline material present in the polyvinyl alcohol polymer; and
   (c) swelling said annealed replica in an aqueous or nonaqueous swelling solvent, to obtain said substantially shape-retaining swollen contact lens, wherein said lens in its swollen equilibrium state with ocular tear fluid, possesses sufficient oxygen transmissibility to meet the needs of the human cornea.

27. The process of claim 26 wherein said step (a) is carried out in the presence of a polyvinyl alcohol plasticizer.

28. A process according to claim 27, wherein step (a) is conducted in the presence of about 0.01 to 70% by weight plasticizer, based on the total weight of plasticizer and polyvinyl alcohol.

29. A process according to claim 28, wherein there is between about 0.01 and 30% by weight plasticizer.

30. A process according to claim 27, wherein the plasticizer is glycerol or propylene glycol.

31. A process according to claim 26, wherein the annealing step (b) is conducted under thermal annealing conditions between about 45° C. and 200° C., in the presence of less than 20% by weight water.

32. The process of claim 26 wherein said step (c) is carried out in the presence of a chemical crosslinking agent.

* * * * *